(12) United States Patent
Zilberman et al.

(10) Patent No.: US 6,685,570 B2
(45) Date of Patent: Feb. 3, 2004

(54) PLATE ADAPTER FOR FLEXIBLE HALF COUPLINGS

(75) Inventors: Jossef Zilberman, Columbia, MD (US); Joseph P. Corcoran, Baltimore, MD (US); Robert E. Munyon, Pasadena, MD (US)

(73) Assignee: Kop-Flex, Hanover, MD (US)

( * ) Notice: Subject to any disclaimer, the term of this patent is extended or adjusted under 35 U.S.C. 154(b) by 0 days.

(21) Appl. No.: 10/054,769

(22) Filed: Jan. 22, 2002

(65) Prior Publication Data

US 2003/0139216 A1 Jul. 24, 2003

(51) Int. Cl.$^7$ .............................. F16D 1/033; F16D 3/78
(52) U.S. Cl. ........................ 464/94; 403/11; 403/336; 464/99
(58) Field of Search ........................... 464/69, 91, 93, 464/94, 96, 98, 99; 403/1, 11, 335, 336, 220

(56) References Cited

U.S. PATENT DOCUMENTS

| | | | | |
|---|---|---|---|---|
| 2,712,741 A | * | 7/1955 | Roller | 464/95 |
| 2,877,633 A | * | 3/1959 | Hagenlocher | 464/98 |
| 3,230,741 A | * | 1/1966 | Brutere | 464/98 |
| 3,500,658 A | * | 3/1970 | Goody | 464/99 |
| 4,482,335 A | * | 11/1984 | Goody | 464/94 |
| 4,708,692 A | * | 11/1987 | Weiss | 464/69 |

* cited by examiner

Primary Examiner—Lynne H. Browne
Assistant Examiner—Kenn Thompson
(74) Attorney, Agent, or Firm—Harness, Dickey & Pierce, P.L.C.

(57) ABSTRACT

An improved plate adapter for use with flexible couplings is disclosed which incorporates radially outwardly disposed pilot flanges for engagement with the hub and sleeve of the half coupling which pilot flanges are designed to form a pressfit relationship with the mating surfaces of the hub and sleeve. A suitable bolting arrangement is provided to aid in fitting of the adapter plate to the half coupling as well as to assist in removal of same. Additionally, the fastener arrangement enables fine adjustment of the radial runout of the sleeve of the half coupling relative to the axis of rotation of the shaft to which the half coupling is secured.

28 Claims, 3 Drawing Sheets

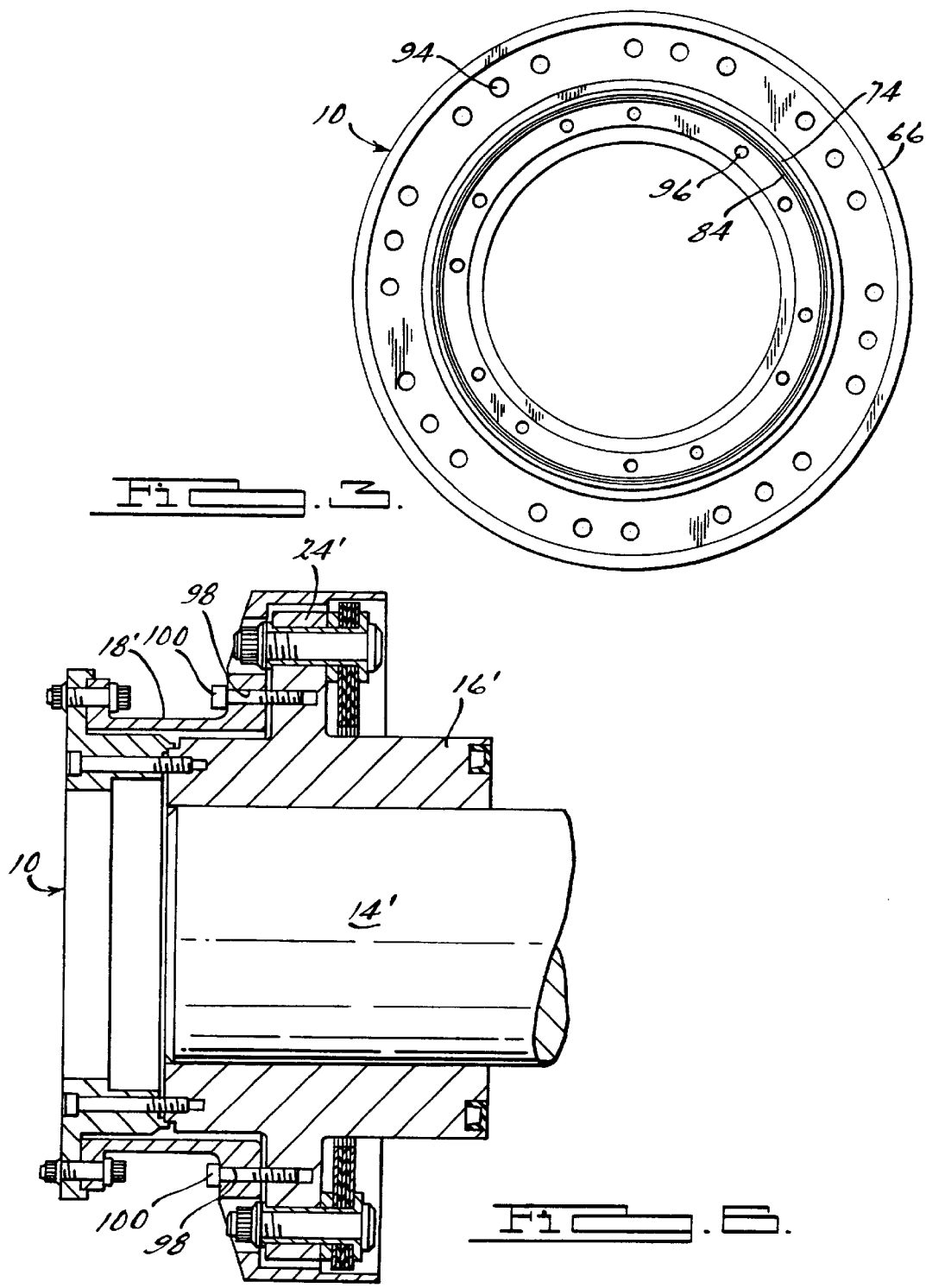

PLATE ADAPTER FOR FLEXIBLE HALF COUPLINGS

BACKGROUND AND SUMMARY OF THE INVENTION

The present invention relates generally to plate adapters for use with flexible couplings and more specifically to such plate adapters which are used to position and rigidify installed half couplings during installation, evaluation and/ or testing of associated operating equipment.

Flexible couplings are commonly used to interconnect driving and driven equipment for transmission of driving forces therebetween while accommodating some degree of misalignment between the respective input and output shafts. One type of such flexible coupling comprises two half couplings, one being connected to each of the output and input shafts of the driving and driven equipment and an interconnecting member extending therebetween. Each of the two half couplings includes a hub secured to the input or output shaft and a sleeve which is connected to the hub by means of a flexible coupling such as a flexible disk pack. A spacer tube serves as the interconnecting member and is secured to each of the opposing sleeves.

In many instances, it is desirable to perform check runs on either the driving or driven equipment independently of each other for various reasons such as to check for vibrations or to check radial run out during installation of the equipment. In order to perform these check runs, it is necessary to secure the half coupling in operative relationship with the shaft and it is also desirable to simulate the weight of the spacer tube and its effect on the center of gravity on the overall coupling. For this purpose, the coupling, manufacture is often requested to provide a plate adapter which is designed to be coupled to both the hub and the sleeve so as to prevent relative movement therebetween.

While existing plate adapters have been satisfactory at relatively low speed rotation, these existing plate adapters have not been completely satisfactory for high speed rotation check runs. During such high speed check runs, such as for example in the range of 5,000 to 15,000 RPM, various nonrepeatable vibrations have been detected. These nonrepeatable vibrations result from slight clearances existing between the plate adapter pilot surfaces and the mating pilot surfaces provided on the coupling, creating unbalanced conditions for the mating parts. At high rotational speeds, any problems resulting from slight clearances may become aggravated due to differential circumferential growth between the mating components. Differential circumferential growth refers to the tendency for a rotating part to increase in size radially outwardly as a result of centrifugal forces exerted thereon during rotation.

The prior art plate adapters employed what may be best described as a slight clearance or loose slip fit annular pilot engagement between the plate adapter and the center hub and an intermediate fit or slight clearance to slight interference fit pilot engagement between the plate adapter and the sleeve with the sleeve pilot surface being located radially outwardly of the plate adapter pilot surface. Because differential circumferential growth is generally greater at greater radial distances, the sleeve will tend to experience greater growth than the plate adapter. Thus, because the mating pilot surface of the sleeve is located radially outwardly from the corresponding pilot surface of the plate adapter, high speed rotation of the assembly will result in a decrease in any slight interference fit or an increase in any slight clearance between the pilot surfaces of the plate adapter and sleeve. As a result, the sleeve may shift very slightly and thus induce a vibration in the overall assembly. Elimination of the clearance induced vibration presents special design and assembly difficulties that have previously not been resolved.

The present invention overcomes the problems associated with the prior art plate adapters by incorporating pilot surfaces on the plate adapter for engagement with both the hub and sleeve which provide for slight interference fits. Further, these pilot surfaces are positioned such that circumferential growth resulting from high speed rotation will operate to increase the interference fit of these pilot surfaces. In this manner, the plate adapter will be able to substantially reduce, if not totally eliminate, these nonrepeatable vibrations encountered during customer check runs of equipment on which the half coupling has been installed. Additionally, the plate adapter of the present invention incorporates an arrangement to enable adjustment of the radial runout of the sleeve thus facilitating alignment of the driving and driven equipment without the need for removal of one or both of the half couplings.

Additional advantages and features of the present invention will become apparent from the subsequent description and the appended claims taken in conjunction with the accompanying drawings.

BRIEF DESCRIPTION OF THE DRAWINGS

FIG. 3 is an end view of the plate adapter shown in FIGS. 1 and 2 with the plate shown removed from the half coupling;

FIG. 4 is an enlarged fragmentary view of the portion of the plate adapter and coupling assembly enclosed within circle 4 of FIG. 2;

FIG. 5 is an enlarged fragmentary view of the portion of the plate adapter and coupling assembly enclosed within circle 5 of FIG. 2;

FIG. 6 is a view similar to that of FIG. 2 but showing another embodiment of the present invention.

DESCRIPTION OF THE PREFERRED EMBODIMENTS

Figure 1:
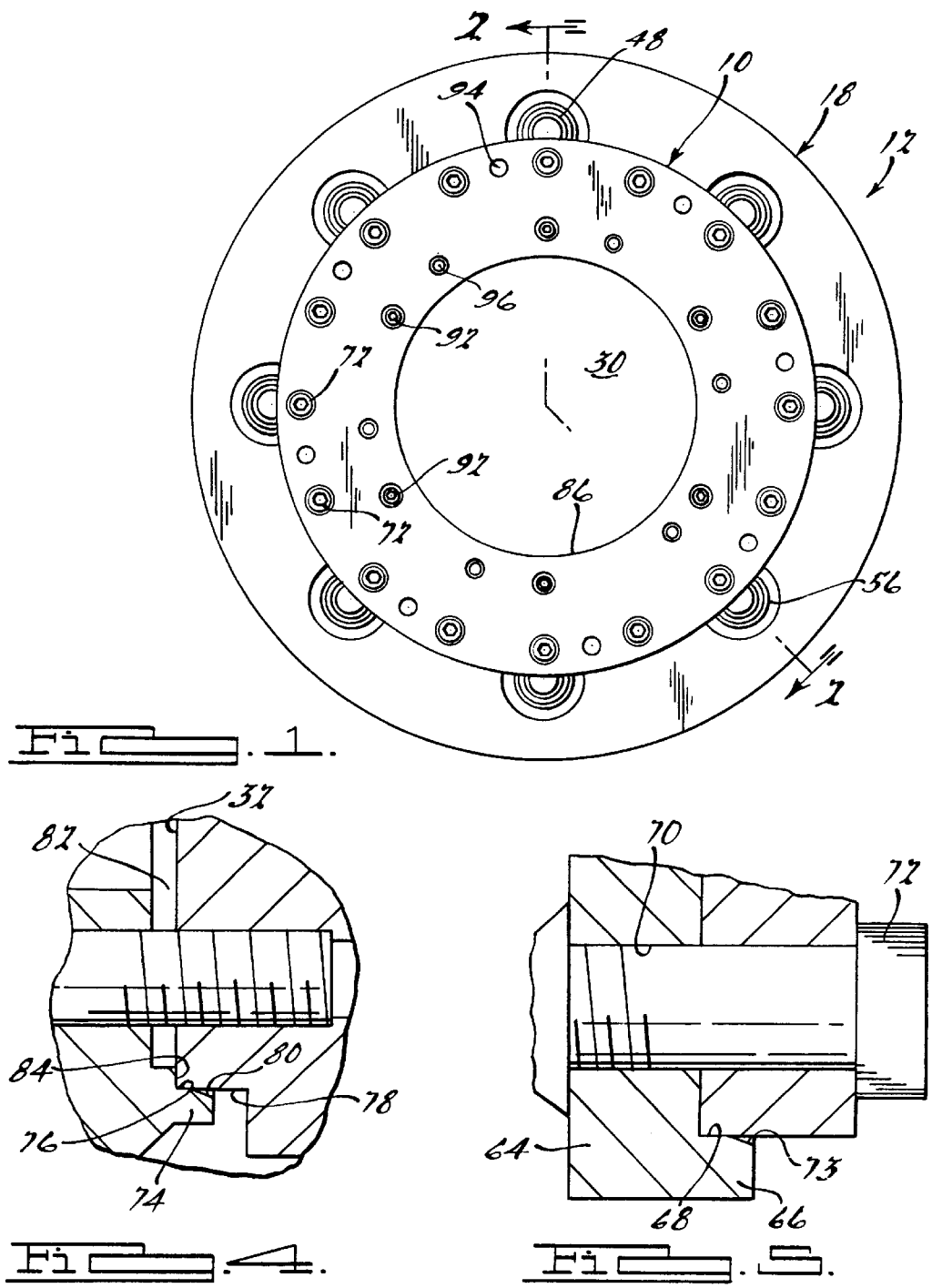
FIG. 1 is an end view of a flexible half coupling with a plate adapter operatively assembled thereto, all in accordance with the present invention.
Figure 2:
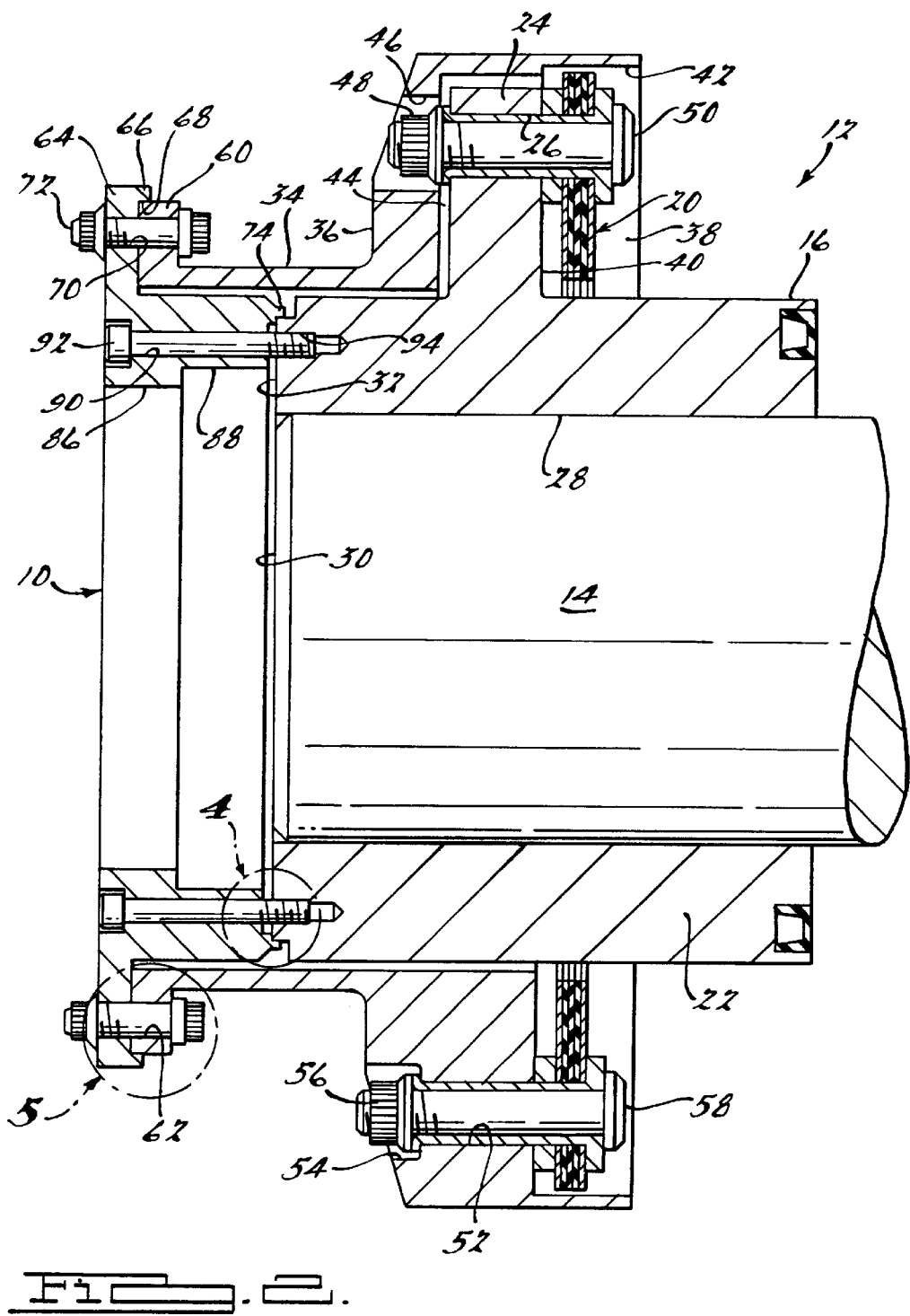
FIG. 2 is a section view of the assembly shown in FIG. 1, the section being taken along line 2—2 thereof.

Referring now to the drawings and in particular to FIGS. 1 and 2, there is shown a plate adapter 10 assembled to a half coupling 12 which is secured to a shaft 14, all in accordance with the present invention. As shown, half coupling 12 comprises a hub 16, an outer sleeve 18 and a flexible disk pack 20.

Hub 16 has a generally cylindrically shaped elongated main body portion 22 from which a plurality of circumferentially spaced axially aligned ears 24 project radially outwardly. Preferably, four such ears 24 will be provided on hub 16 being equally circumferentially spaced although a greater or lesser number of such ears 24 may be provided. Generally, ears 24 will be positioned approximately midway along the length of hub 16 and include a bore 26 extending axially therethrough. A center bore 28 is provided in hub 16 which is sized to accommodate the shaft 14 of the driven or driving apparatus with which the coupling is to be utilized. Preferably, bore 28 will be sized so as to provide a secure press fit assembly on shaft 14 with the outer end 30 of shaft being positioned in substantially coplanar relationship with the outer end 32 of hub 16.

As shown, shaft 14 has a generally constant diameter along its length and may be provided with one or more keys and associated keyways cooperating with suitable keyways on hub 16 to ensure against relative rotation therebetween. Alternatively shaft 14 as well as bore 28 may be tapered and with hub 16 merely pressfitted thereto with or without the incorporation of keyways and associated keys. Auxiliary retention means such as a thread end portion and associated nut may also be utilized to ensure retention of hub 16 on shaft 14. In any event, bore 28 of hub 16 will be sized for a tight pressfit engagement with shaft 14 and, as is typical with such a connection, the forces resulting from this interference fit may result in a slight increase in the diameter of hub 16.

Sleeve 18 comprises a hollow generally cylindrically shaped body 34 from which an annular flange 36 extends generally radially outward at one end. The inside diameter of hollow body 34 is preferably slightly greater than the outside diameter of hub 16 so as to provide a clearance therebetween and to enable sleeve to be telescopically fitted over the outer end of hub 16. Radially extending flange 36 has an axial length so as to overlie and extend slightly beyond ears 24 of hub 16 and to radially overlie disk pack 20. An annular counterbore 38 is provided in flange 36 being defined by axially facing surface 40 and radially inwardly facing surface 42 and sized so as to accommodate disk pack 20 with a generous clearance therebetween. Additionally, a plurality of circumferentially spaced axially extending recesses 44 are provided in surface 40 being positioned so as to receive respective ears 24 of hub 16 and sized to provide a generous clearance therearound.

A first plurality of substantially equally circumferentially spaced bores 46 are provided in flange 36, one of which opens into each of the aforementioned recesses 44 and are aligned with bores 26 provided in respective ears 24. Bores 46 are sized to accommodate and allow access to flanged nuts 48 utilized in conjunction with threaded fasteners 50 for securing disk pack 20 to respective ears 24 of hub 16.

A second plurality of bores 52 are also provided in flange 36, one being preferably positioned midway between each of bores 46. The outer end of each of bores 52 is provided with a counterbore 54 sized to accommodate and afford access to flanged nuts 56 which, with threaded fasteners 58, operates to secure disk pack 20 to sleeve 18.

A second annular flange 60 extends generally radially outwardly from body 34 of sleeve 18 at the axially opposite end thereof and includes a plurality of substantially equally circumferentially spaced bores 62 extending axially therethrough.

As thus far described, half coupling 12, exclusive of plate adapter 10, is generally of conventional design presently commercially available and will serve to transmit driving or driven forces between shaft 14 and sleeve 18 via flexible disk pack 20.

Referring now to FIGS. 2–5, plate adapter 10 will be described in greater detail. Plate adapter 10 is generally cylindrical in shape having an outside diameter less than the inside diameter of sleeve 18 so as to be easily received within the outer end thereof and provide a generous clearance therebetween. A generally radially outwardly extending flange 64 extends from the outer end of plate adapter 10 into overlying relationship with flange 60 of sleeve 18. A pilot flange 66 extends axially from the radially outer end of flange 64 and has a radially inwardly facing annular surface 68 dimensioned so as to form a slight pressfit engagement with the radially outwardly facing surface of flange 60 provided on sleeve 18. A plurality of circumferentially spaced bores 70 are provided in flange 64 which are aligned with bores 62 provided in flange 60 of sleeve 18 to accommodate threaded fasteners 72 for securing plate adapter 10 to sleeve 18. Additionally, surface 68 may be provided with a slight chamfer 73 to aid in assembly of plate adapter 10 to coupling 12.

A second annular pilot flange 74 is provided on the axially inner end of plate adapter 10 projecting axially therefrom. Pilot flange 74 defines a radially inwardly facing surface 76 having a diameter such as to provide for a pressfit engagement with radially outwardly facing surface 78 of hub 16. Preferably, pilot flange 74 will have a relatively thin radial section to impart limited flexibility thereto. This limited flexibility is desirable so as to aid pilot flange 74 in accommodating the slight increase in diameter of hub 16 as a result of its pressfit installation on shaft 14. For example, pilot flange 74 may be sized so as to provide a 0.000 inch–0.002 inch pressfit engagement with hub 16 prior to the installation of hub 16 on shaft 14 which would correspond to a 0.006 inch–0.007 inch pressfit engagement after hub 16 has been installed on a 6 inch diameter shaft. Preferably, in such an application, pilot flange 74 will have a radial thickness in the range of 0.06 inch–0.12 inch. Additionally, in order to facilitate assembly of plate adapter 10 to hub 16, pilot flange 74 will preferably be provided with a slight chamfer 80 on surface 76 thereof.

As best seen with reference to FIG. 4, plate adapter 10 has an annular recess 82 machined in the end surface thereof so as to provide a relatively narrow axially facing surface 84 for engaging end surface 32 of hub 16.

Referring once again to FIG. 2, plate adapter 10 also includes an outer central bore 86 of a diameter slightly greater than that of bore 28 in hub 16 which opens inwardly into a slightly enlarged diameter bore 88. Bore 88 is preferably sized so as to accommodate a retention nut such as may be used to ensure retention of hub 16 on shaft 14 as mentioned above.

Plate adapter 10 also includes a plurality of circumferentially spaced axially extending countersunk bores 90 adapted to accommodate threaded fasteners 92 which threadedly engage axially extending openings 94 in surface 32 of hub 16. Fasteners 92 are used to aid in assembling plate adapter 10 to half coupling 12 and to ensure full mating engagement of surfaces 76 and 84 thereof with surfaces 74 and 32 of hub 16.

It should be noted that fasteners 92 may be removed prior to any check runs of the assembly if desired which enables any suitable common threaded fastener to be used. If fasteners 92 are to be retained in position as shown during any check runs, it is important that they be properly matched in weight in order to avoid the introduction of any unbalanced forces which may cause unwanted extraneous vibrations.

In order to assemble plate adapter 10 to half coupling 12, plate adapter 10 is first loosely placed in position with bores 70 thereof axially aligned with bores 62 of sleeve 18. Thereafter, threaded fasteners 72 may be assembled thereto and slightly tightened. Thereafter, threaded fasteners 72 will be progressively tightened in a sequential manner to draw pilot flange 66 into overengaging relationship with flange 60 until plate adapter 10 is fully seated on sleeve 16.

Next, threaded fasteners 92 may be assembled and sequentially tightened to draw pilot flange 74 into overengaging relationship with surface 74 of hub 16. Thereafter, the radial runout of sleeve 18 may be checked in any suitable manner to ensure it is concentric with the axis of rotation of shaft 14. Fasteners 74 may then be selectively tightened to afford any necessary small adjustment to ensure a desired minimal radial runout. In this regard, it should be noted that the provision of gap 82 serves to limit the extent of surface 84 engaging end 32 of hub 16 so as to accommodate this fine adjustment of radial runout.

As noted above, because pilot flange 66 is positioned radially outwardly of flange 60, any differential circumferential growth resulting from high speed rotation will result in an increase in the pressfit relationship between flanges 60 and 66. The reason for this is that magnitude of differential circumferential growth experienced by a part will relate directly to the radial distance between its center of mass or mass distribution and the axis of rotation. As can readily be seen from FIG. 2, the mass distribution in a radial direction is at a substantially greater distance from the axis of rotation for sleeve 18 than for plate adapter 10 and therefore sleeve 18 will experience a greater differential circumferential growth than will plate adapter 10. The same is true for hub 16 as compared to plate adapter 10 although the differential is not as great. Thus, the differential circumferential growth of hub 16 will result in an increase in the pressfit relationship between pilot flange 74 and hub 16 as pilot flange 74 is located radially outwardly of surface 78 of hub 16. It should be noted that because this differential is less between plate adapter 10 and hub 16, a tighter interference fit is preferably provided at pilot flange 74 than at flange 66.

In order to aid in removal of plate adapter 10 from half coupling 12 such as in preparation for installation of the spacer sleeve to interconnect the driving and driven equipment, plate adapter 10 is provided with first and second pluralities of circumferentially spaced jacking holes 94, 96 through which suitable fasteners may be inserted so as to apply an axially directed force against surface 32 of hub 16 and against the outer surface of flange 60 of sleeve 18. In this manner, the fasteners in the jacking holes will exert a smooth separating force to disengage the interengaging pressfitted pilot surfaces thus allowing removal of plate adapter 10 without exerting undue stress on disk pack 20.

Referring now to FIG. 6, in some applications, it may be desirable to apply an even greater rigidizing force between sleeve 18 and hub 16 than can be applied by use of the plate adapter and fasteners 92 alone. In such an application, sleeve 18 may be provided with a plurality of circumferentially spaced bores 98 designed to accommodate threaded fasteners 100 which threadedly engage aligned openings in respective ears 24' of hub 16. As noted above with respect to fasteners 92, if fasteners 100 are to be maintained in assembled relationship with hub 16' and sleeve 18', during any check runs of the equipment, it is important that they be suitably matched so as to avoid introduction of any potential vibration causing unbalance to the assembly.

As may now be appreciated, the plate adapter of the present invention provides an improved arrangement for precisely and repeatably locating and rigidifying the sleeve relative to the hub of a flexible half coupling so as to thereby facilitate check runs of the associated equipment without generation of extraneous vibrations. Further, the plate adapter of the present invention incorporates means to facilitate easy installation and removal of the plate adapter without exerting undue stress on the flexible disk pack forming a part of the half coupling.

While it will apparent that the preferred embodiments of the invention disclosed are well calculated to provide the advantages and features above stated, it will be appreciated that the invention is susceptible to modification, variation and change without departing from the proper scope or fair meaning of the subjoined claims.

What is claimed is:

1. A plate adapter for rigidizing a flexible coupling half, said flexible coupling half including a hub adapted to be secured to the shaft of a rotating apparatus and a sleeve interconnected with said hub by means of a flexible disk pack, said plate adapter comprising:
   a main body having a first portion engageable with said hub and an annular flange extending radially from said main body; and
   a pilot flange projecting from said annular flange, said pilot flange sized to form an interference fit with a portion of said sleeve;
   wherein said plate adapter is spaced away from the flexible disk pack and adapted to rigidize the flexible coupling half when attached thereto.

2. A plate adapter as set forth in claim 1 wherein said pilot flange includes a generally radially inwardly facing surface, said inwardly facing surface forming a press fit relationship with said sleeve.

3. A plate adapter as set forth in claim 1 wherein said flange includes a plurality of circumferentially spaced bores positioned so as to be alignable with bores provided on said sleeve, said bores being adapted to receive fasteners for securing said plate adapter to said coupling.

4. A plate adapter as set forth in claim 3 wherein said flange includes a plurality of threaded jacking holes, said jacking holes being adapted to receive threaded fasteners for aiding in removal of said plate adapter from said coupling.

5. A plate adapter as set forth in claim 1 wherein said plate adapter includes a second pilot flange provided on said main body, said second pilot flange being engageable with said hub.

6. A plate adapter as set forth in claim 5 wherein said second pilot flange is adapted to form a press fit engagement with said hub.

7. A plate adapter as set forth in claim 6 wherein said main body includes a plurality of generally axially extending bores adapted to accommodate fasteners for use in drawing said second pilot into assembled relationship with said hub.

8. A plate adapter as set forth in claim 7 wherein said main body includes a second plurality of jacking holes, said jacking holes being adapted to accommodate fasteners for use in removal of said plate adapter from said hub.

9. A rigidized flexible coupling half comprising:
   a hub secured to a rotatable shaft of a driven or a driving machine;
   a sleeve telescopically receiving a portion of said hub in one end thereof;
   a flexible disk pack secured to said sleeve and to said hub and being operative to transmit rotational forces therebetween; and
   a plate adapter having a first pilot flange overengaging a portion of said sleeve to rigidly position said plate adapter relative to said sleeve and a second pilot flange engageable with said hub in a press fit relationship to rigidly position said hub with respect to said plate adapter;
   wherein said plate adapter is adapted to simulate the weight of the half coupling of the other of the driven or driving machine.

10. A rigidly flexible coupling half as set forth in claim 9 wherein said plate adapter includes a generally axially facing shoulder engageable with said hub, the engagement of said shoulder with said hub allowing for slight angular adjustment of the axis of said plate adapter relative to the axis of said hub.

11. A rigidized flexible coupling half as set forth in claim 10 wherein said second pilot flange is positioned radially adjacent said shoulder.

12. A rigidized flexible coupling half as set forth in claim 9 wherein said plate adapter includes a first plurality of jacking holes, each of said jacking holes being adapted to accommodate a fastener for exerting a force between said plate adapter and said sleeve to aid in disengaging said first pilot flange from said sleeve.

13. A rigidized flexible coupling half as set forth in claim 12 wherein said plate adapter includes a second plurality of jacking holes, each of said second plurality of jacking holes being adapted to accommodate fasteners for exerting a force between said plate adapter and said hub to aid in disengaging said second pilot flange from said hub.

14. A rigidized flexible coupling half as set forth in claim 13 further comprising a plurality of fasteners for securing said plate adapter to said sleeve, said fasteners being operative to aid in moving said first pilot flange into a press fit relationship with said sleeve during assembly of said plate adapter to said coupling.

15. A rigidized flexible coupling half as set forth in claim 14 further comprising a second plurality of fasteners, said second plurality of fasteners being operative to aid in moving said second pilot flange into a press fit relationship with said hub during assembly of said plate adapter to said coupling.

16. A rigidized flexible coupling half as set forth in claim 15 wherein said second plurality of fasteners also operate to secure said plate adapter to said hub.

17. A rigidized flexible coupling half as set forth in claim 15 wherein said second plurality of fasteners further operates to enable adjustment of the radial runout of said sleeve.

18. A rigidized flexible coupling half as set forth in claim 15 further comprising a third plurality of fasteners, said third plurality of fasteners extending between said sleeve and said hub.

19. A rigidized flexible coupling half as set forth in claim 9 wherein said sleeve is positioned in spaced surrounding relationship to said hub and said plate adapter operates to precisely position said sleeve relative to said hub.

20. A rigidized flexible coupling half comprising:
   a hub adapted to be secured to a shaft, said hub having a plurality of radially outwardly extending circumferentially spaced ears and an end face;
   a sleeve having a throughbore having one end positioned in surrounding spaced relationship to a portion of said hub;
   a flexible annular disk pack secured to each of said ears and secured to said sleeve at locations circumferentially spaced from said ears;
   an adapter plate located axially opposite the one end and having a first flange portion overengaging an outer peripheral surface of said sleeve and a second flange portion overengaging a peripheral surface of said hub adjacent said end face to thereby rigidly retain said sleeve in a predetermined position relative to said hub whereby check runs of said apparatus may be conducted without removal of said rigidized flexible coupling half from said shaft.

21. A rigidized flexible coupling half as set forth in claim 20 wherein said second flange is sized to form a press fit relationship with said peripheral surface of said hub when said hub is secured to said shaft.

22. A rigidized flexible coupling half as set forth in claim 21 wherein said first flange is sized to form a slight interference fit with said peripheral surface of said sleeve.

23. A rigidized flexible coupling half as set forth in claim 20 wherein said plate adapter extends into the other end of said sleeve and is positioned in spaced relationship to said throughbore.

24. A rigidized flexible coupling half as set forth in claim 20 wherein said plate adapter has a shoulder portion adjacent said second flange, said shoulder portion being engageable with said end face.

25. A rigidized flexible coupling half as set forth in claim 24 further comprising a first plurality of fasteners extending between said plate adapter and said hub, said fasteners being operative to facilitate adjustment of the radial runout of said plate adapter and said sleeve.

26. A rigidized flexible coupling half as set forth in claim 25 further comprising a second plurality of fasteners extending between said sleeve and said hub, said second plurality of fasteners being operative to facilitate adjustment of the radial runout of said sleeve.

27. A plate adapter for use with a flexible coupling, said flexible coupling including a hub adapted to be secured to the shaft of rotating apparatus and a sleeve interconnected with said hub by means of a flexible disk pack, said plate adapter comprising:
   a main body having a first portion engageable with said hub and an annular flange extending radially from the main body;
   a pilot flange projecting from said main body, said pilot flange sized to form an interference fit with a portion of said sleeve; and
   a plurality of threaded jacking holes adapted to receive threaded fasteners for aiding in removal of said plate adapter from said coupling.

28. A plate adapter for rigidizing a flexible coupling half, said flexible coupling half including a hub adapted to be secured to a shaft of a rotating apparatus and a sleeve interconnected with said hub by means of a flexible disk pack, said plate adapter comprising:
   a main body having a flexible pilot adapter to engage said hub in a press-fit relationship and to ensure a residual press-fit contact between said flexible pilot and said hub upon high speed rotation, and an annular flange extending from said main body; and
   a pilot projecting from said annular flange extending radially from said main body, said pilot sized to form an interference fit between said main body and said sleeve;
   wherein a mass distribution of the plate adapter results in an increase in said interference fit between said annular flange extending radially from said main body and said sleeve upon high speed rotation.

* * * * *